Aug. 7, 1951     D. J. KNOX     2,563,533
LASSO
Filed Nov. 10, 1947     2 Sheets-Sheet 1
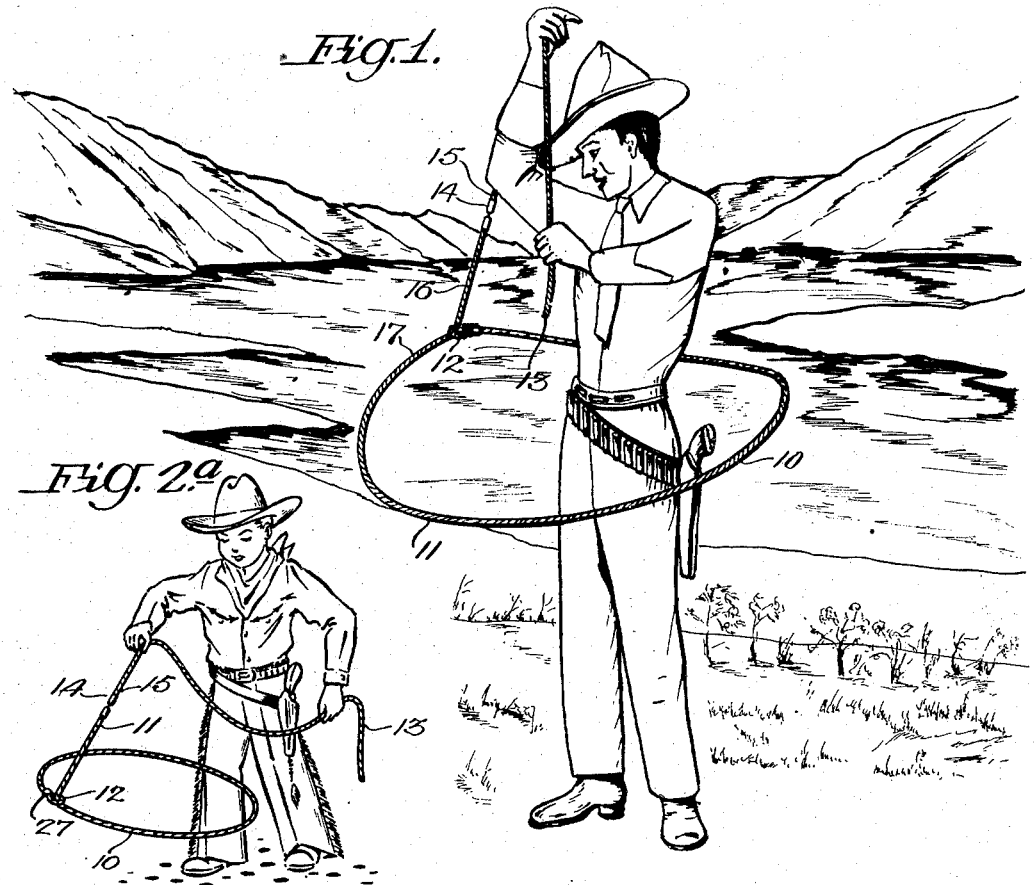
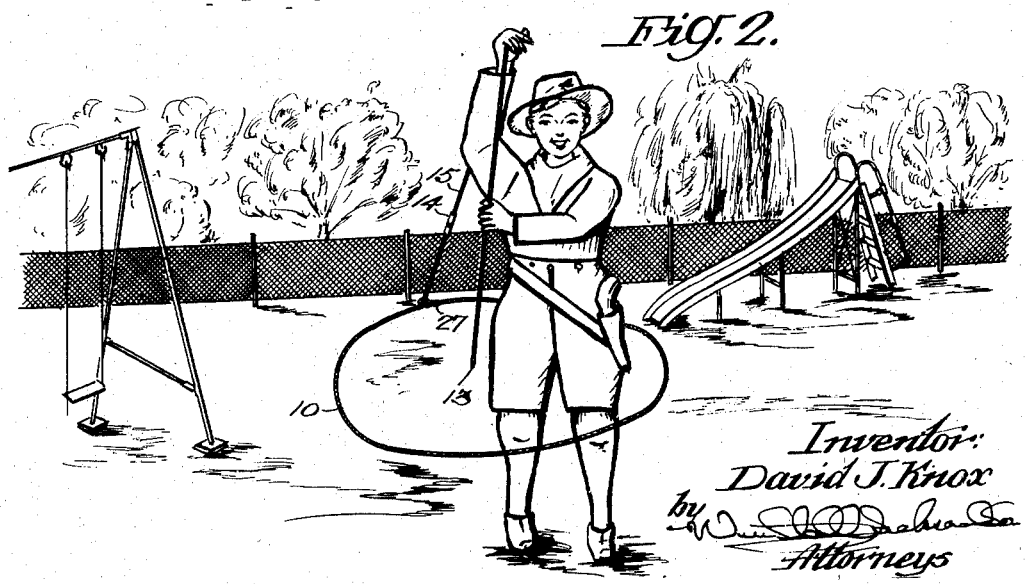

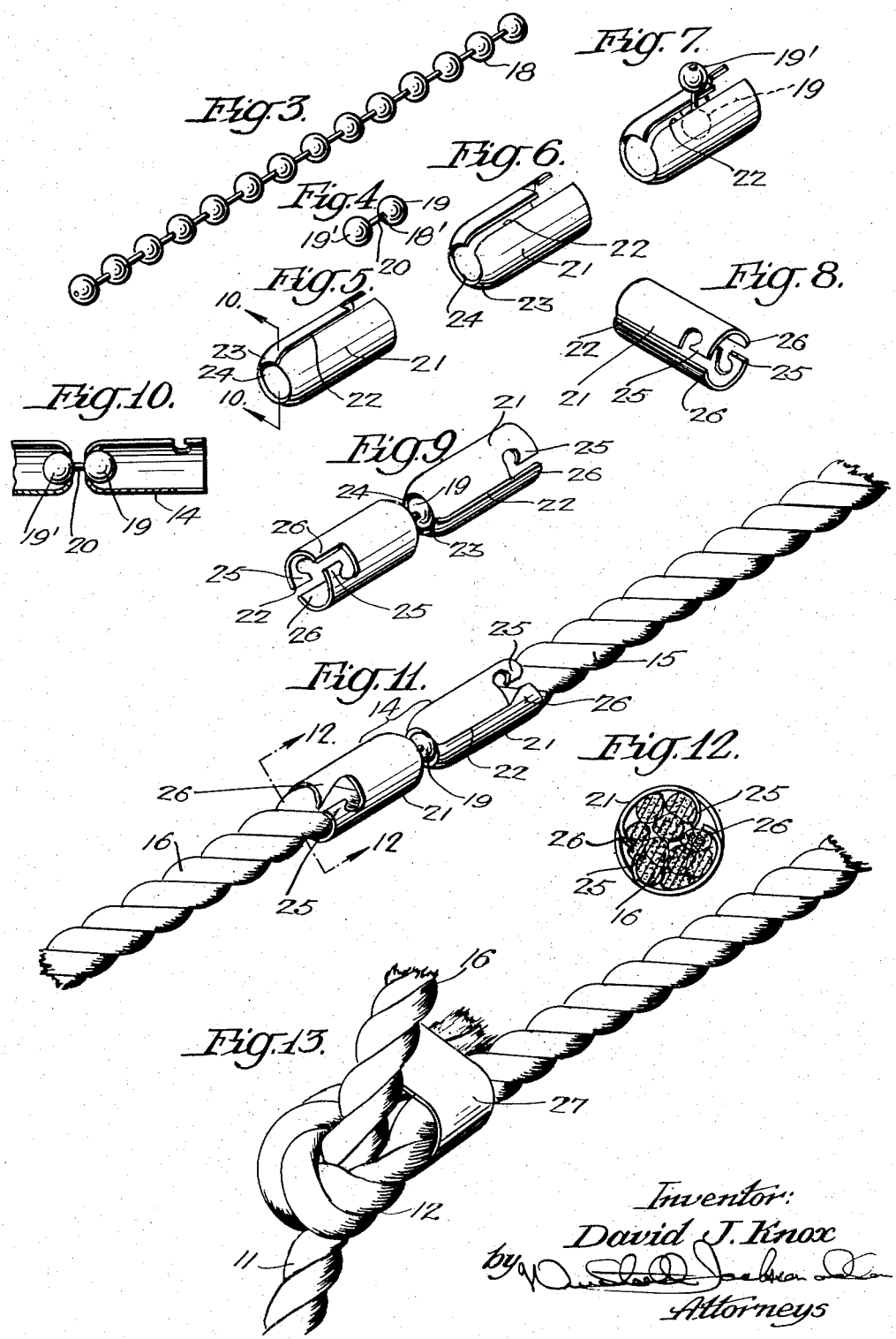

Patented Aug. 7, 1951

2,563,533

UNITED STATES PATENT OFFICE 2,563,533

LASSO

David J. Knox, Upper Darby, Pa.

Application November 10, 1947, Serial No. 785,017

1 Claim. (Cl. 119—153)

My invention relates to swivel connections for use with lassos, lariats, spinning ropes, leashes, clothes lines and the like.

The main purpose of my invention is to construct a detachable swivel connection for use as a universal joint in a rope line.

A further purpose is to provide detachable ball and socket connections between two parts of a rope line.

A further purpose is to use slitted multiple sockets and balls between two parts of a rope.

A further purpose is to imbed a projection of a ball receiving socket into a rope.

A further purpose is to provide a lasso or the like with a universal joint connection comprising ball and socket thimble connections approximately midway between the rope ends.

A further purpose is to use a slitted pressed metal fitting as connector for a swivel for a rope.

A further purpose is to provide a slitted pressed metal connector fitting with projections to impinge a rope strand to aid in fastening the connector to the rope.

A further purpose is to provide connections between strand sections which connections can be detached one from the other when too much stress occurs, if the rope is under excess tension.

A further purpose is to use ball and slitted socket connections between pressed metal connections of a rope.

A further purpose is to apply longitudinally slitted ball connecting members to a rope strand.

Further purposes appear in the specification and in the claims.

I have preferred to illustrate my improved rope connector as being applied to lassos or lariats although it can be applied as a connector for clothes line, dog leashes or leaders or to any rope or strap which may become twisted or entangled by any winding or movement.

In the drawings I have chosen to illustrate a few only of the numerous embodiments in which my invention may appear, choosing the forms shown from the standpoints of convenience in illustration, satisfactory operation and clear demonstration of the principles involved.

Figure 1 is a perspective view of an adult spinning a rope of my invention.

Figure 2 is a perspective view of a boy spinning a rope with my improved connection thereon and with the rope surrounding the operator.

Figure 2ᵃ is a view similar to Figure 2, but with the operator outside the loop of the rope.

Figure 3 is a fragmentary perspective view of a ball chain used in making up my invention.

Figure 4 is a perspective view of a section of the chain of Figure 3 which is used as the connector proper in making up my improved swivel connection.

Figure 5 is a perspective view of one of the ball-carrying slitted connectors in closed position.

Figure 6 is a view similar to Figure 5 but in open position.

Figure 7 is a view similar to Figures 5 and 6 illustrating the ball carrying shaft in the slot of the connector before the ball is placed permanently in the end of the connector.

Figure 8 is a persective view of the fitting of Figures 5, 6 and 7 but showing the opposite end from that shown in the previous figures.

Figure 9 is a perspective view showing the connector units joined together with the ball connections in place.

Figure 10 is a longitudinal sectional view taken on the line 10—10 of Figure 5 showing the connector balls in place within the connector sockets.

Figure 11 is a perspective view similar to Figure 9 but with the end of a rope in place within each of the connectors of the swivel and with the rope having the projections of the swivel embedded therein.

Figure 12 is an enlarged transverse sectional view taken on the line 12—12 of Figure 11.

Figure 13 is a fragmentary perspective view of the eye end of its fastening for use in my invention.

My invention is primarily intended to provide a swivel connection between two rope ends.

I find it quite desirable to use this connection in a lasso or spinning rope in order to avoid the undesirable twisting of the rope when it is being manipulated, preventing the necessity of twisting a rope at its end in a clockwise direction as is done by professional spinners and lariat throwers.

I have also found that it adapts itself very well to clothes line joints by allowing the sections of the clothes line to move independently one from the other and thereby keep out of the line the undesirable twisting and tangling of the rope.

By splitting a dog leash intermediate its ends the swivel connector of my invention can be applied to the leash. This will allow for the animal to move in different directions without twisting the leash strand to some undesirable position to have the whole line twisted.

My line will be easily operated either by an adult or a child because of its simplicity in action.

The invention will permit any one to operate a spinning rope with the apparent ease of a professional rope spinner because by using a swivel connection with the ball and socket connections between the different rope sections the rope will not twist as it would if the swivel were not present.

In Figure 1 where an adult is shown spinning a rope the operator is encircled by a loop 10 of a rope 11. One end of the loop 10 is provided with an eye 12 through which the opposite end 13 of the rope passes. At the end of the rope section 13 I secure one end of my improved swivel connection 14 to the rope end 15. The opposite end of the swivel connection 14 is fastened to one end 16 of the rope section 17. It will be noted that when the swivel is in place the rope will be continuous.

In Figure 2 I have illustrated the same spinning rope for use by a small boy and with the rope surrounding the boy. (Figure 2a is a view similar to Figure 2, but with the rope loop outside of the boy.)

In making up my invention I have found it desirable to use fabricated parts already on the market. The ball connectors 18 of Figure 3 are cut from the chain into a unit 18' which comprises balls 19 and 19' with an intermediate tie in the form of a wire 20. The wire 20 is joined to the balls to securely hold them together.

I have also used fabricated thimbles or connectors 21 slitted longitudinally at 22. The forward end of the thimble 21 is peened at 23 for purposes hereinafter described. It will be noticed that the slit 22 in Figure 5 is almost closed.

In Figure 6, however, the slit 22 has been opened somewhat in order to permit the insertion within the slit 22 of the ball unit 18' whereby the wire or joint strap 20 can be passed through the slot with one of the balls 19 within the thimble and the other ball 19' outside the thimble. This is clearly shown in Figure 7. After the ball connector has been put into its proper place within the thimble the slit is again closed to a position somewhat similar to that of Figure 5 but the ball connector will be in place in the thimble.

The same operation takes place in the opposing thimble member as has taken place in the thimble described.

The joining of the thimble is clearly illustrated in Figures 9 and 10 where the balls 19 and 19' of the unit 18' are set to place within opposing thimbles and the balls are placed in position against the openings 24 provided by the peening operation 23. The opposite end of each thimble is provided with prongs 25 and 26 which are adapted to be pressed into the strand when the thimble is placed about the rope. The metal thimble of course is resilient and the slitting of the thimble allows for insertion of the rope within the thimble, after which the thimble can then be pressed about the rope to engage the rope tightly and at the same time the fingers 25 and 26 will be pressed into the rope and embedded in the rope to hold the thimbles securely in position about the rope ends. This is shown in Figure 11 and in Figure 12.

One of the great advantages besides the advantage of the swivel connection is the ball joint which I employ. The advantage of the particular ball joint is that under ordinary circumstances, and without too great a stress on the rope connection, the sections of the rope will be firmly held together to make a continuous rope. If, however, the stress on the rope is too great either ball in either thimble can be pulled through the opening 24 and thereby permit the sections of the rope to come apart. This is due to the resiliency of the slitted thimble when excess stress is placed on the rope.

In Figure 13 I have illustrated one rope end with an eye 12 having the opposite end 16 of the rope passing through the eye 12. The end of the rope comprising the eye 12 is secured to the opposite portion of the rope by means of a metal clamp 27.

Should a child playfully lasso one of his playmates the swivel will become disconnected at the ball bearing joint, under a twenty pound pull, but yet may be very easily and simply reconnected making it as good as new. Another safety feature which is also very important is that, should a child grasp the lasso on the other side of the swivel, I have found that the small loop will not slide very freely and will become disconnected under a stress. It may, however, be very easily repaired.

Another feature of my invention is that the swivel and its connecting parts are small, compact and not very noticeable to the eye and can be very easily covered or camouflaged to prevent any one except the user from knowing that there is a swivel in the rope line.

It will be evident that the sockets are made of resilient sheet metal, steel or other stampings which can yield to permit separation of the swivel under excessive stress.

It will be evident that the balls of the double chain link are widely enough spaced so as to permit angular freedom of the sockets with respect to one another, as best seen in Figure 10, so that flexibility is imparted to the lasso beyond the normal flexibility of the rope. This is a very desirable feature.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim and desire to secure by Letters Patent is:

A lasso comprising a rope having a loop at one end and a metallic swivel socket at the other end surrounding that other end, having an opening and having a longitudinal split line extending from the opening, a pair of connected ball chain links one of which is engaged within the socket and held by the walls of the opening, a cooperating socket engaging the opposite ball and having an end opening and a longitudinal split extending from the opening, the walls of the opening engaging the ball, and a rope extending within and gripped by the second socket, whereby the swivel can resiliently open and permit separation under excessive stress without destruction, whereby the swivel will separate in case of overload.

DAVID J. KNOX.

REFERENCES CITED

The following references are of record in the file of this patent:

UNITED STATES PATENTS

| Number | Name | Date |
| --- | --- | --- |
| 342,850 | Smith | June 1, 1886 |
| 1,703,579 | Gaffner | Feb. 26, 1929 |
| 1,818,301 | Canaday | Aug. 11, 1931 |
| 1,993,010 | La Rue | Mar. 5, 1935 |
| 2,036,172 | Gagnon | Mar. 31, 1936 |
| 2,126,586 | Stuber | Aug. 9, 1938 |